(12) United States Patent  
Thabit

(10) Patent No.: US 8,064,193 B2  
(45) Date of Patent: Nov. 22, 2011

(54) LAPTOP ACCESSORY HOLDER

(76) Inventor: Ahmed Thabit, Minneapolis, MN (US)

( * ) Notice: Subject to any disclaimer, the term of this patent is extended or adjusted under 35 U.S.C. 154(b) by 177 days.

(21) Appl. No.: 12/579,164

(22) Filed: Oct. 14, 2009

(65) Prior Publication Data

US 2011/0019360 A1    Jan. 27, 2011

Related U.S. Application Data

(60) Provisional application No. 61/271,619, filed on Jul. 23, 2009.

(51) Int. Cl.  
*G06F 1/16* (2006.01)

(52) U.S. Cl. .............. 361/679.27; 312/223.2; 345/690; 362/197

(58) Field of Classification Search ............. 361/679.21, 361/679.26, 679.27, 679.32; 312/223.1, 312/223.2, 223.3; 108/28; 345/690; 206/320; 362/191, 194, 197  
See application file for complete search history.

(56) References Cited

U.S. PATENT DOCUMENTS

| | | | |
|---|---|---|---|
| 5,379,201 A | 1/1995 | Friedman | |
| 7,248,463 B2 | 7/2007 | Bander et al. | |
| 7,505,256 B2 | 3/2009 | Boudreau | |
| 7,586,739 B2 | 9/2009 | Weksler et al. | |
| 2007/0090007 A1 | 4/2007 | Ames | |
| 2008/0164790 A1* | 7/2008 | Tsang et al. | 312/223.2 |
| 2009/0078168 A1* | 3/2009 | Larsen | 108/28 |
| 2010/0194785 A1* | 8/2010 | Huitema et al. | 345/690 |

* cited by examiner

*Primary Examiner* — Hung Duong  
(74) *Attorney, Agent, or Firm* — C. G. Mersereau; Nikolai & Mersereau, P.A.

(57) ABSTRACT

An accessory system for a laptop computer is disclosed which includes a framework adapted to be attached to a top display system of a laptop computer. The accessory system includes an extendable device-carrying arrangement having laterally adjustable holders that retract into the framework when not in use and can be extended beyond the framework to hold items when desired. An auxiliary electronic power port connection provides an auxiliary power source for lighting and battery charging device. The system includes an attachment arrangement capable of attaching the system to the display screen section of a laptop computer.

19 Claims, 4 Drawing Sheets

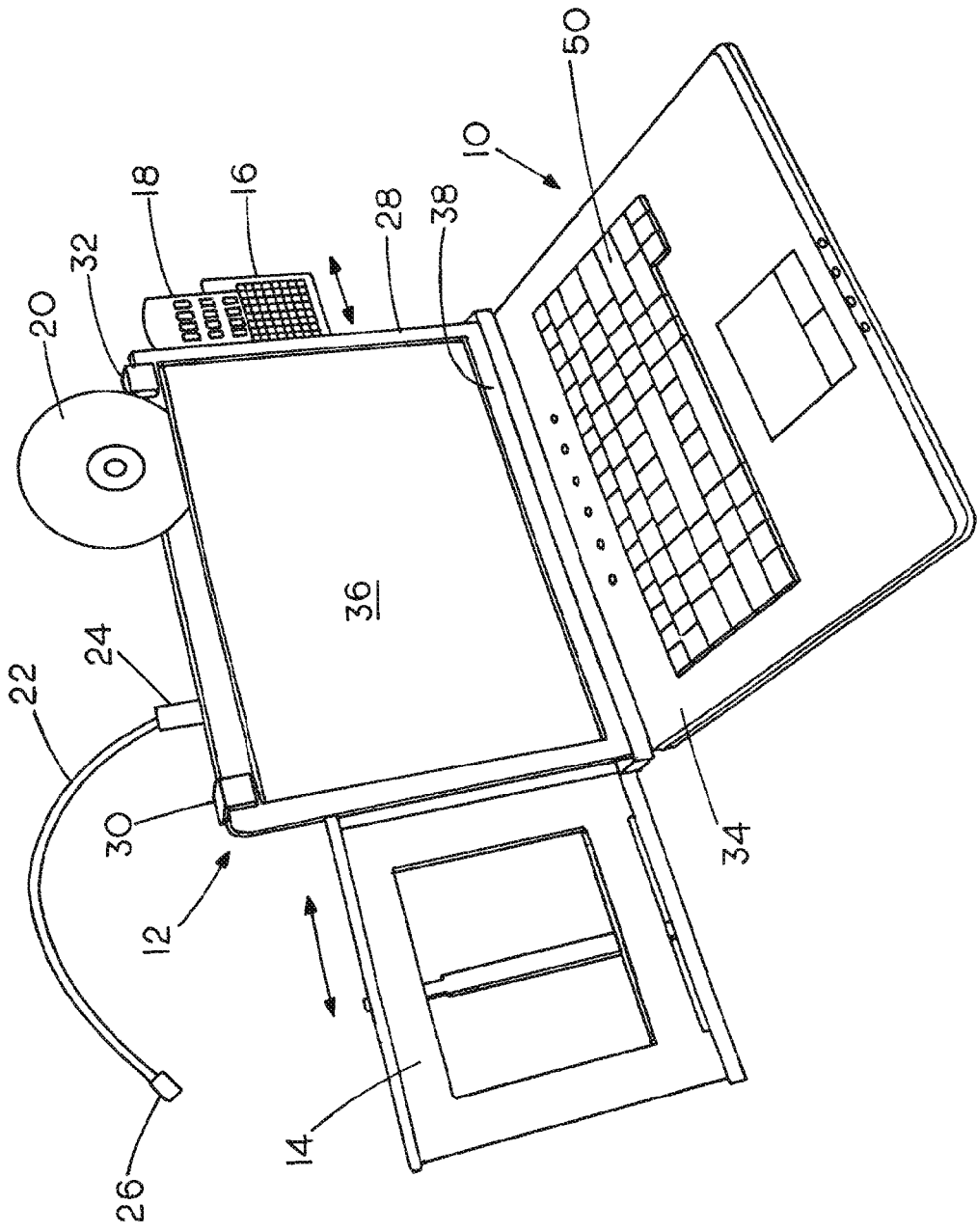

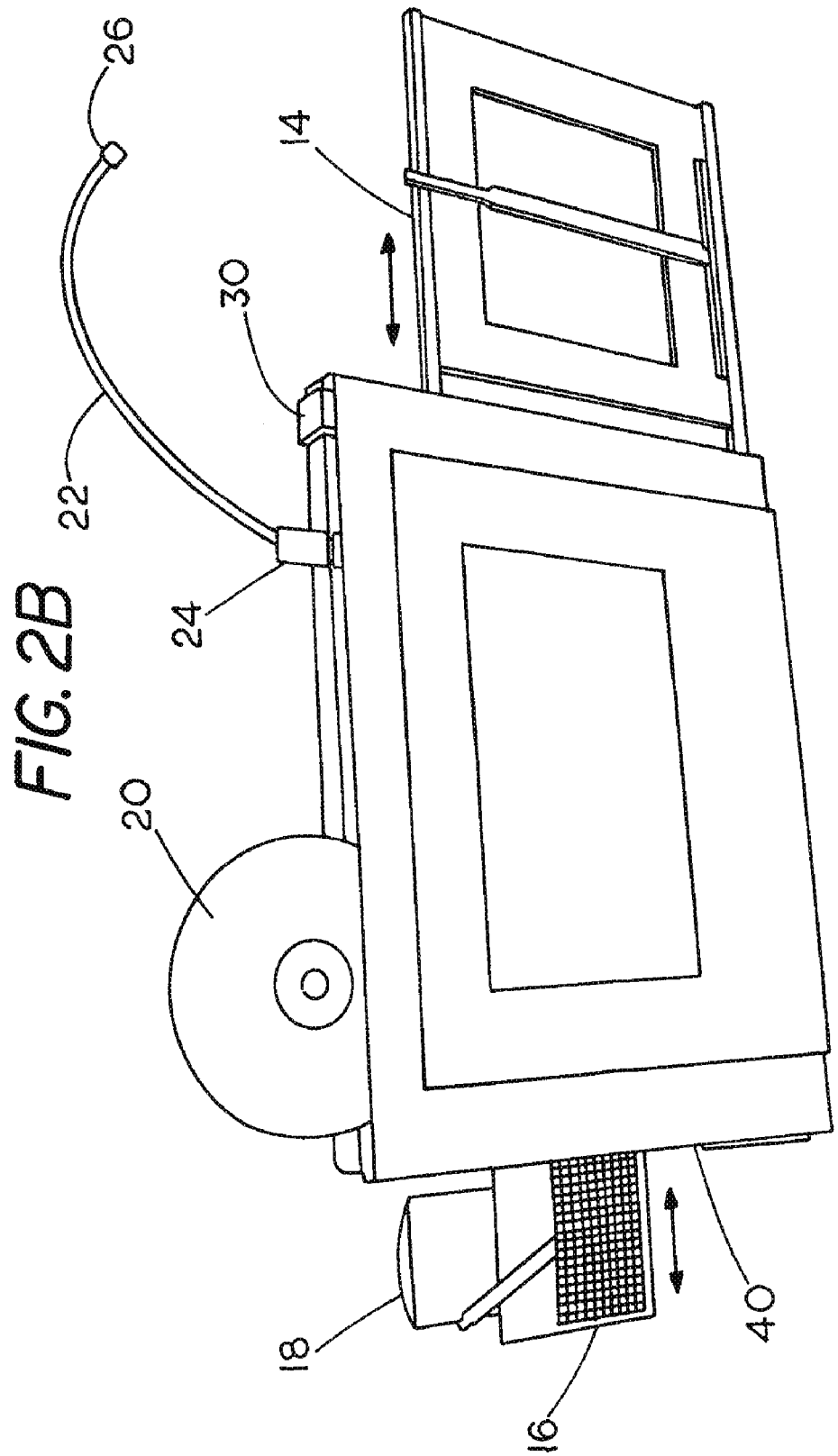

LAPTOP ACCESSORY HOLDER

CROSS-REFERENCED TO RELATED APPLICATIONS

This application is a non-provisional application claiming priority to provisional application No. 61/271,619 filed Jul. 23, 2009 which is deemed incorporated herein by reference in its entirety, for any purpose.

STATEMENT REGARDING FEDERALLY FUNDED RESEARCH OR DEVELOPMENT

Not applicable

BACKGROUND OF THE INVENTION

I. Field of the Invention

The present invention relates generally to accessory devices for portable computing equipment such as laptops and notebooks and, more particularly, to accessory holders that readily attach to and detach from raised upper sections of such computers and that can accommodate and store a variety of accessory devices and auxiliary tools for the computer user.

II. Related Art

Computing technology has progressed at a rapid rate to include smaller, more powerful devices. A variety of laptop or notebook computers have become very popular and they are readily available from a number of well-known manufacturers. These devices are generally made up of a base section connected by a pivoting hinge to an upper section which can be opened when the system is in use and closed and latched, forming a compact arrangement for transport and storage when the device is not in use. The base section includes a keyboard, power supply, disc drive and a variety of additional components. The upper section features a display screen and speakers, but may also include other components or controls. Both the upper and lower sections are typically encased in a plastic housing which is lightweight and affords a level of protection.

It is known to provide a cover or case for a laptop device and covers are available that protect the outside surface of the computer. These may include handles, straps or other carrying aspects and further may enclose the computer using snaps or zippers. The covers or cases must be opened, the computer removed and any necessary auxiliary cables connected before the computer can be used. It is also known to provide a laptop cover that includes a storage aspect. One such device is described in Ames (U.S. Patent Publication No. US2007/0090007) which discloses a laptop cover that includes a storage section located between multiple layers and which can be accessed through a side opening in the laptop cover.

Other computer-related add-on devices have been contrived. Bader et al. (U.S. Pat. No. 7,248,463 B2) shows a framed image display with a frame attachable to the back side of the upper section or display housing of a laptop computer.

Auxiliary devices with frames are also shown, for example, by Freedman in U.S. Pat. No. 5,379,201 which discloses a portable light that attaches to the raised, display or upper section of a laptop computer.

While all of the accessory devices available at this time offer some advantage to the laptop user, there remains a definite need for an auxiliary laptop accessory holder that offers a combination of storage and working advantages.

SUMMARY OF THE INVENTION

By means of the present invention, there is provided a laptop accessory system in the form of an auxiliary device holder that readily attaches to and detaches from the upper or display screen-containing upper section of a laptop computer. Storage aspects enable laptop users to enjoy fast and convenient access to their most important auxiliary devices such as cell phones, iPods, CDs, papers, pens, pencils, etc. Electronic add-on aspects are provided and may include a power port that plugs into and expands a single USB port from the laptop to, for example, four ports. Auxiliary lighting, cell phone chargers and other devices can easily be accommodated by the additional ports.

The accessory holder of the invention is designed to be secured to the back of the laptop display screen section by means of an integral strap that simply fits and slides over the screen section nesting alongside the computer hinge and two hooks are provided that attach to the top of the upper or screen section to complete the attachment. The device can thereafter be simply lifted off the upper computer section and removed readily.

The tool storage aspect generally includes laterally adjustable holding devices which can be retracted inside side openings in the accessory device holder when not in use and which slide laterally outward conveniently operated by the thumb and index finger of the user. The laterally adjustable holding devices may include one or more pockets or pouches designed to accommodate items such as iPods, cell phones and an attached fabric holder may accommodate miscellaneous items such as glasses, pens, pencils, etc. on one side of the laptop accessory holder while the opposite side may include an extending paper holder to which papers of various sizes can be readily clipped. One or more slots or pockets to accommodate CDs may also be provided.

The laptop accessory device holder may be made in any convenient size to be accommodated by (positioned on) any size of portable computer upper section and may be made as thin as one-half inch (1.27 cm) or less. In addition, the device may be made of any convenient material and preferred materials include readily moldable plastic materials such as ABF plastic material, or the like.

BRIEF DESCRIPTION OF THE DRAWINGS

In the drawings, wherein like reference characters denote like parts throughout the same:

FIG. 1 is a front perspective view of an open laptop computer with an embodiment of the accessory holder of the invention attached thereto;

FIG. 2B is a rear view of the accessory holder of FIG. 2A;

DETAILED DESCRIPTION

The following detailed description describes one or more embodiments of the invention that are meant as examples illustrating the principles of the invention and are not intended to convey limitations on the concepts in any manner, it being recognized that those skilled in the art may contemplate modifications well within the scope of the present concepts.

The present invention involves compact accessory system for laptop computers that expands and enables users of laptop computers to upgrade a common laptop device to a more complete work station almost instantly providing the user with an organized attachment system complete with common auxiliary devices and tools conveniently arranged by a device that readily attaches to the upper or display screen section of the laptop computer. The accessory system is also easily removed and expandable aspects retracted for storage.

Figure 2A:
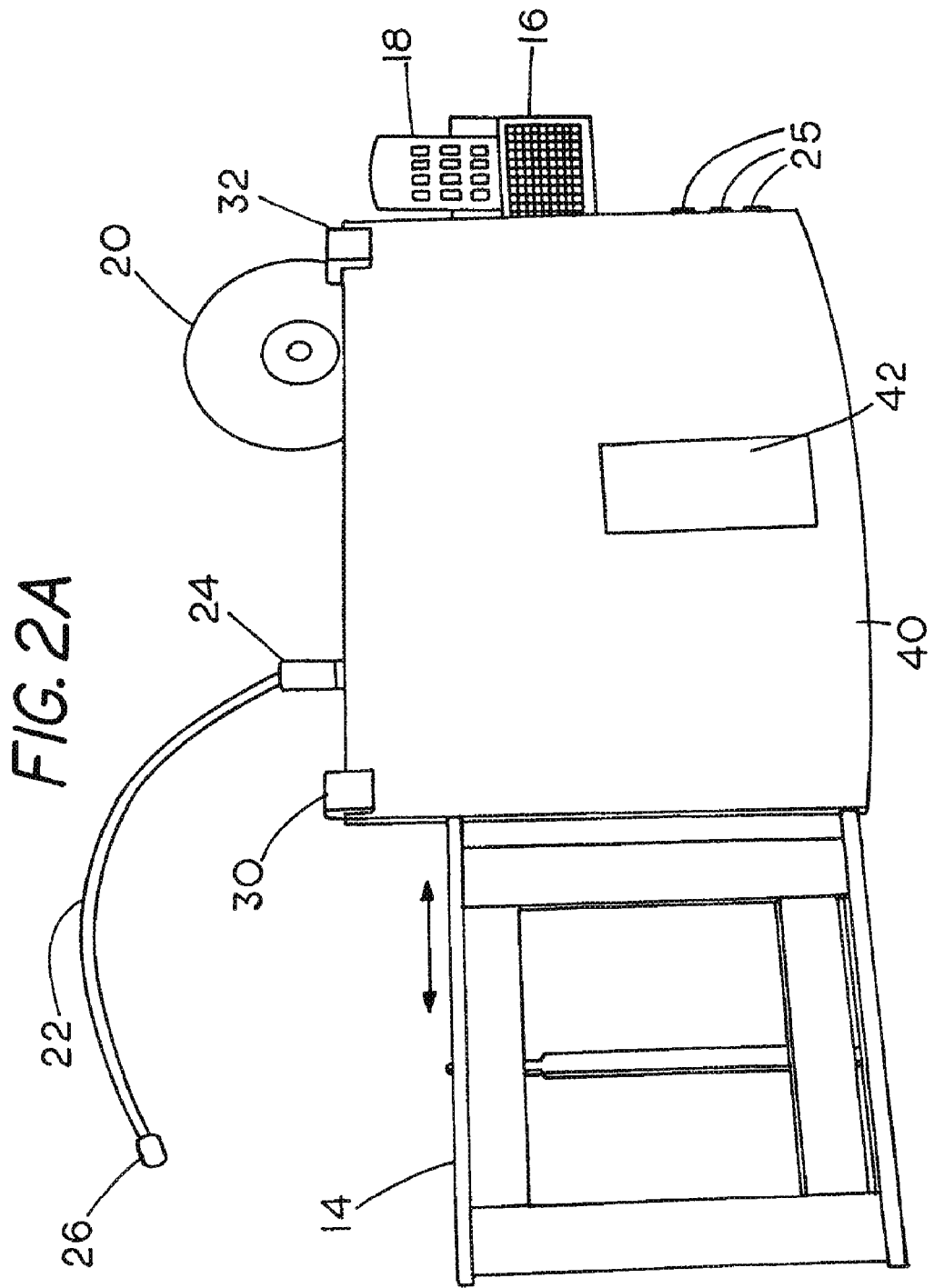
FIG. 2A is a front view of the accessory holder of FIG. 1.

FIGS. 1, 2A and 2B show one embodiment of the invention. FIG. 1 depicts a front perspective view of an open laptop computer and FIGS. 2A and 2B depict front and rear views generally at 10 with an embodiment of the accessory holder, generally 12, attached and in an expanded state. The accessory holder further includes a laterally adjusting paper holder frame 14, laterally adjusting pouch 16 for accommodating a cell phone, iPod or other device of the class which includes handheld cordless communication devices and other items, as shown at 18. A slot or pocket is provided for holding and storing a CD 20 is shown. A flexible USB cable 22 is connected internally at 24 and electrically to a voltage outlet port as at 25 and carries an illuminating device at 26. The accessory holder further includes a frame 28 that supports a pair of top attachment hooks 30, 32 and a bottom or lower strap 34 that slides over the upper or display screen section 36 of the computer 10 rests over the hinge junction 38 of the laptop 10 but does not obscure the display screen or keyboard. As shown in FIGS. 2A and 2B, the accessory holder may include a back panel 40 and a support leg 42 which can be opened and used for stand-alone support. An auxiliary plug in can be used to plug the stand-alone unit into a laptop computer or the like.

As shown, the bottom section of the laptop 10 includes a keyboard 50 which, together with the screen 36 are completely unencumbered by the addition of the laptop accessory holder of the invention. In addition, the laptop accessory holder of the invention adds very little to the space required by the user of the laptop computer to complete a work station.

Figure 3:
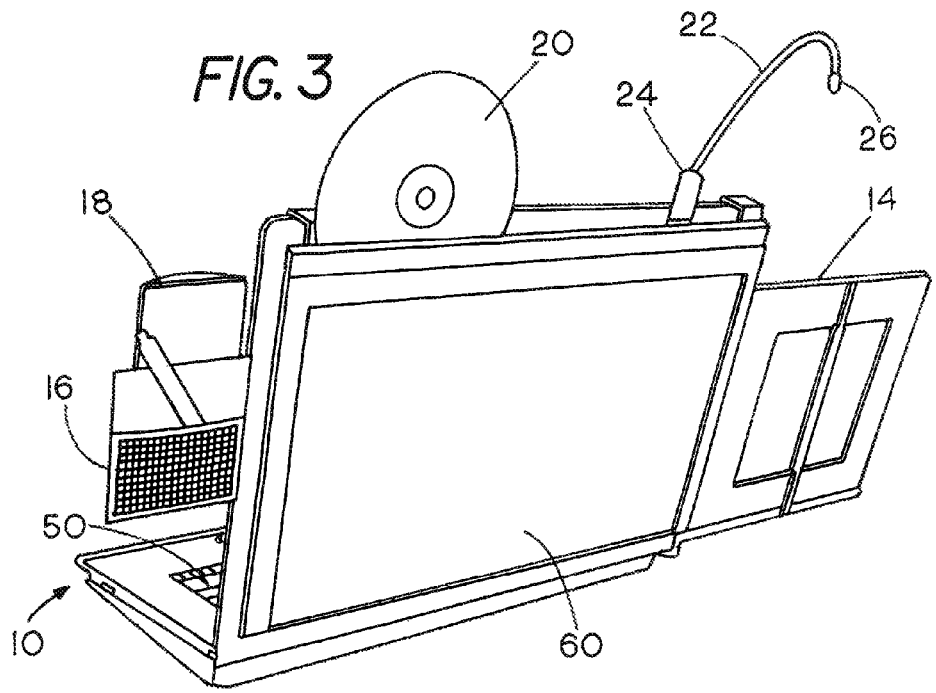
FIG. 3 is a rear perspective view of an alternative embodiment of the accessory holder attached to a laptop computer device.
Figure 4:
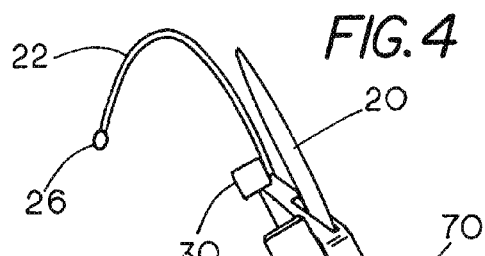
FIG. 4 is a side perspective view of the accessory holder.

FIG. 3 depicts an alternative embodiment of the laptop accessory holder of the invention which replaces the rear panel of the system shown in FIGS. 1, 2A and 2B with an LCD screen 60 such that images may be displayed on that screen for the benefit of those observing the back of the upper or display screen panel from the rear. FIG. 4 depicts a side slot 70 which may accommodate a laterally adjustable device in accordance with the invention.

Figure 5:
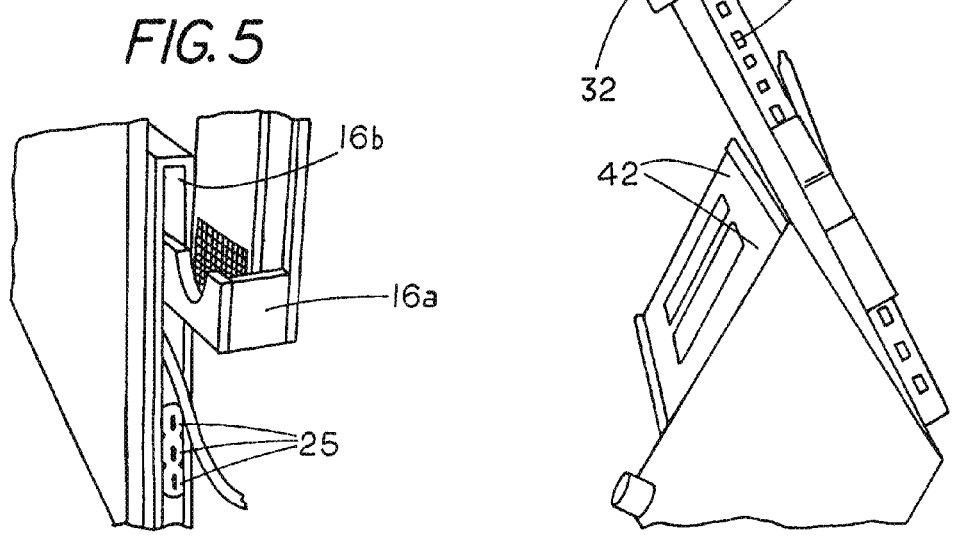
FIG. 5 is a side perspective view of another embodiment depicting the add-on ports and other details.

FIG. 5 shows additional ports 25 and a laterally adjustable holder or pouch 16a slidable into a recess 16b.

Thus, it can readily be seen that the laptop accessory holder of the invention provides a convenient and useful addition to such a device that expands the abilities of a user in a readily acceptable manner which does not interfere with the normal use of the device. This enables the user to accommodate additional tools and devices without taking up a great deal of additional space and enables these things to be conveniently at hand during the use of the computer.

This invention has been described herein in considerable detail in order to comply with the patent statutes and to provide those skilled in the art with the information need to apply the novel principles and to construct and use embodiments of the examples as required. However, it is to be understood that the invention can be carried out by specifically different devices and that various modifications can be accomplished without departing from the scope of the invention itself. For example, other laterally adjustable holding devices can be accommodated by the accessory system of the invention as an example. In addition, it should be noted that, whereas the device has specifically been described as relating to laptop computers, it will be recognized that such a device would be useful in other work and storage environments.

What is claimed is:

1. An accessory system for a laptop-type computer comprising:
    (a) a framework adapted to be attached to a hinged upper display screen section of a portable computer, said computer having a base section connected to said upper section by a hinge arrangement;
    (b) an extendable device-carrying arrangement comprising laterally adjustable holders that retract into the framework when not in use and can be extended out from the framework to hold items when desired;
    (c) electronic power port connection that provides an auxiliary power source for lighting and battery charging devices; and
    (d) an attachment arrangement comprising integral parts suitable for attaching said accessory system to the display screen section of a laptop computer.

2. An accessory system as in claim 1 wherein said attachment arrangement includes a strap and plurality of hooks.

3. An accessory system as in claim 2 wherein said hooks are adapted to attach over the exterior surface of an upper edge of an open screen section of a laptop computer and said strap attaches to the bottom at said in joint.

4. An accessory system as in claim 1 wherein said extendable device-carrying arrangement further comprises a laterally adjustable device for holding papers of various sizes.

5. An accessory system as in claim 1 further comprising a slot-shaped recess suitable for accommodating a compact disc (CD).

6. An accessory system as in claim 5 wherein said slot-shaped recess is in the top of said framework.

7. An accessory system as in claim 1 further comprising an adjustable auxiliary lighting device attachable to said framework.

8. An accessory system as in claim 1 wherein said extendable device-carrying arrangement further comprises a laterally adjustable open pocket container suitable for accommodating a handheld device selected from wireless electronic devices selected from a class including cell phones and iPod devices.

9. An accessory system as in claim 8 wherein said open pocket container further comprises an aspect for carrying writing utensils.

10. An accessory system as in claim 1 wherein said framework includes a back plate.

11. An accessory system as in claim 10 wherein said back plate includes a support bracket for stand-alone support.

12. An accessory system as in claim 1 wherein said framework is sized to fit about a display screen section of a portable computer.

13. An accessory system as in claim 1 further comprising a liquid crystal display screen on the back portion of said framework facing away from a user of an associated portable computer.

14. An accessory system for a laptop-type computer comprising:
    (a) a framework adapted to be attached to a hinged upper display screen section of a portable computer, the computer having a base section connected to said upper section by a hinge arrangement;
    (b) an extendable device-carrying arrangement comprising laterally adjustable holders that retract into the framework when not in use and can be extended beyond the framework to hold items when desired; and
    (c) an attachment arrangement comprising integral parts suitable for attaching said accessory system to the display screen section of a laptop computer.

15. An accessory system as in claim 14 wherein said attachment arrangement includes a strap and plurality of hooks.

16. An accessory system as in claim 14 wherein said extendable device-carrying arrangement further comprises a laterally adjustable device for holding papers of various sizes.

17. An accessory system as in claim 14 further comprising a slot-shaped recess suitable for accommodating a compact disc (CD).

18. An accessory system as in claim 17 wherein said extendable device-carrying arrangement further comprises a laterally adjustable open pocket container suitable for accommodating other items.

19. An accessory system as in claim 18 wherein said open pocket container further comprises an aspect for carrying writing utensils.

\* \* \* \* \*